United States Patent
Su

[11] Patent Number: 6,029,649
[45] Date of Patent: Feb. 29, 2000

[54] STRUCTURE OF A DOOR OF AN OVEN

[76] Inventor: Yung Sen Su, P.O. Box 82-144, Taipei, Taiwan

[21] Appl. No.: 09/275,091

[22] Filed: Mar. 24, 1999

[51] Int. Cl.[7] ....................................................... F23M 7/00
[52] U.S. Cl. ......................... 126/200; 126/294; 126/19 R; 126/41 R
[58] Field of Search .................................... 126/200, 194, 126/190, 19 R, 41 R

[56] References Cited

U.S. PATENT DOCUMENTS 3,986,488  10/1976  Hannebaum ............................ 126/200

Primary Examiner—Carroll Dority
Attorney, Agent, or Firm—A & J

[57] ABSTRACT

An oven includes a body portion and a door engageable with the body portion, the body portion being generally cylindrical in shape having two lateral sides each formed with a circular groove, each of the lateral sides having two vertical slots extending upwardly from the circular groove, the door having two flanges at two ends thereof each provided with two protuberances at an inner side thereof, the protuberances being configured to be slidable within the circular groove and the vertical slots, whereby the door can be dismantled from the body portion for removing the grease and other drippings extracted from food during the roasting process.

1 Claim, 5 Drawing Sheets

STRUCTURE OF A DOOR OF AN OVEN

BACKGROUND OF THE INVENTION

1. Field of the Invention

This invention is related to an improvement in the structure of a door for an oven.

2. Description of the Prior Art

It has been found that the door of the conventional electric ovens is permanently hinged to the body portion, as shown in FIG. 5. Hence, the door cannot be dismantled from the oven for removing grease and other drippings extracted from food during the roasting process thereby making it very difficult to clean the oven and therefore causing much inconvenience in use.

Therefore, it is an object of the present invention to provide an improvement in the structure of a door of an oven which can obviate and mitigate the above-mentioned drawbacks.

SUMMARY OF THE INVENTION

This invention is related to an improvement in the structure of a door of an oven.

According to a preferred embodiment of the present invention, an oven Includes a body portion and a door engageable with the body portion, the body portion being generally cylindrical in shape having two lateral sides each formed with a circular groove, each of the lateral sides having two vertical slots extending upwardly from the circular groove, the door having two flanges at two ends thereof each provided with two protuberances at an inner side thereof, the protuberances being configured to be slidable within the circular groove and the vertical slots.

It is the primary object of the present invention to provide an improvement in the structure of a door which can be easily removed from an oven.

It is another object of the present invention to provide an improvement in the structure of a door of an oven which can be dismantled for removing the grease and other drippings extracted from food during the roasting process.

It is still another object of the present invention to provide an improvement in the structure of a door which can be rapidly engaged with an oven.

It is still another object of the present invention to provide an improvement in the structure of a door of an oven which is simple in construction.

It is a further object of the present invention to provide an improvement in the structure of a door of an oven which is fit for practical use.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
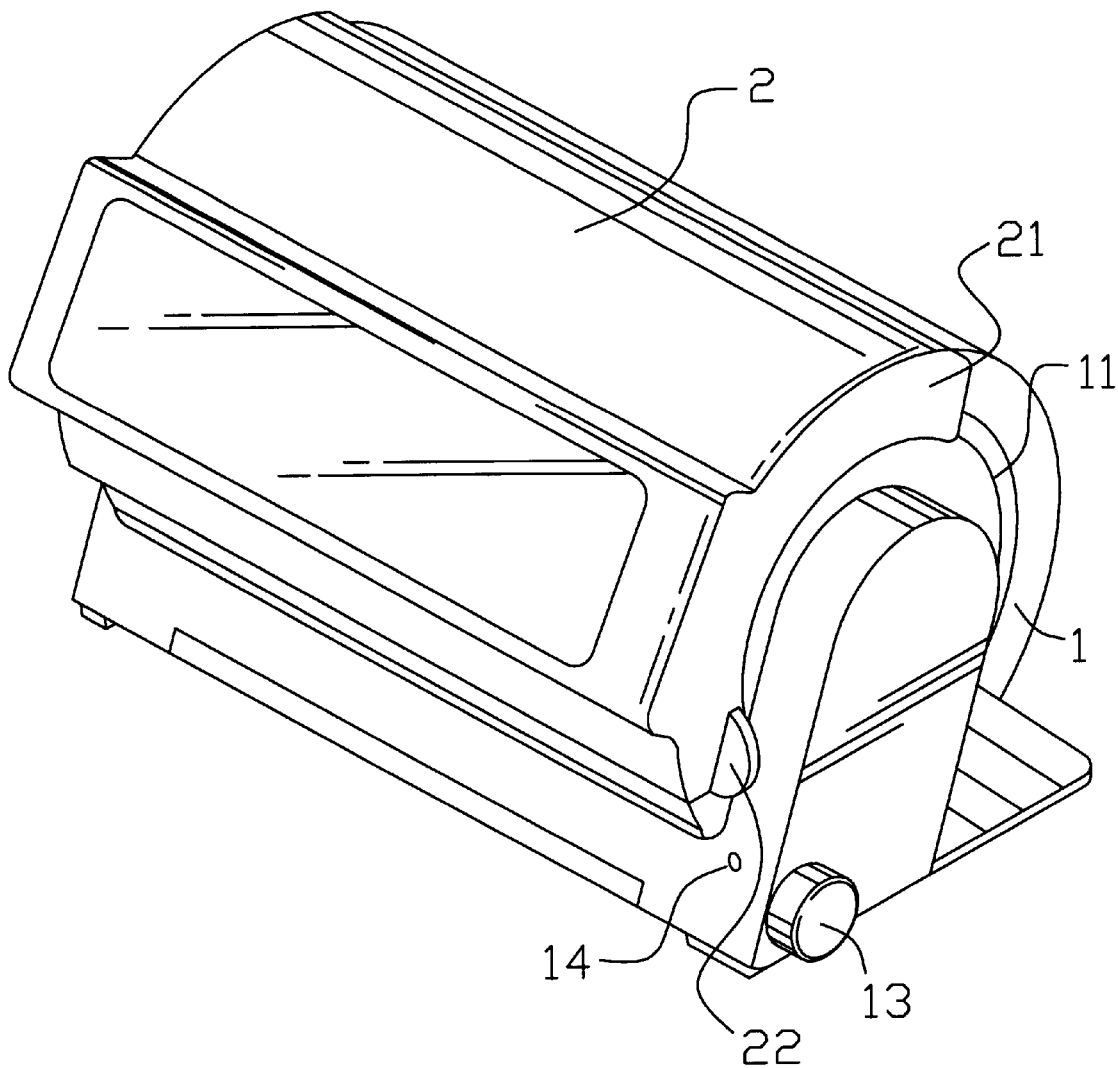
FIG. 1 is a perspective view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
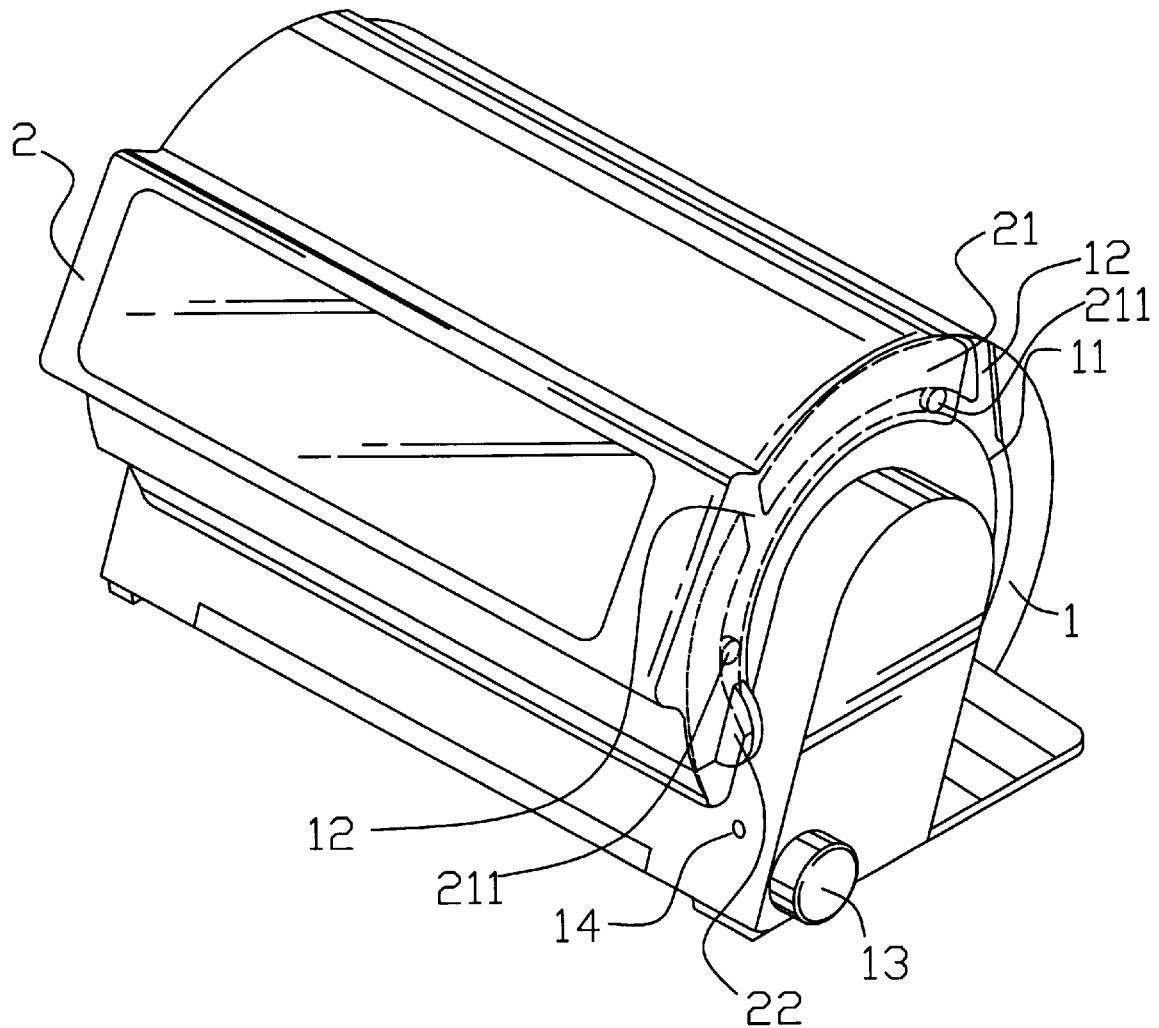
FIG. 2 illustrates the engagement between the door and the body portion of the oven.

With reference to the drawings and in particular to FIGS. 1 and 2 thereof, the oven according to the present invention generally comprises a body portion 1 and a door 2. The body portion 1 is generally cylindrical in shape and provided with a timer 13 at a lateral side and an indicator light 14 at the front side. Both lateral sides of the body portion 1 are each formed with a circular groove 11. The door 2 has two flanges 21 at two ends each provided with two protuberances 211 at the inner side thereof. The protuberance 211 is configured to be slidable within the circular groove 11 so that the door 2 can be rotated with respect to the body portion 1 thereby opening or closing the oven. Each lateral side of the body portion 1 is further formed with two vertical slots 12 extending upwardly from the circular groove 11. The vertical slot 12 is sized so that the protuberance 211 of the door 2 can pass therethrough. The lower end of one of the flanges 21 has a lug 22 for facilitating the operation of the door 2.

Figure 3:
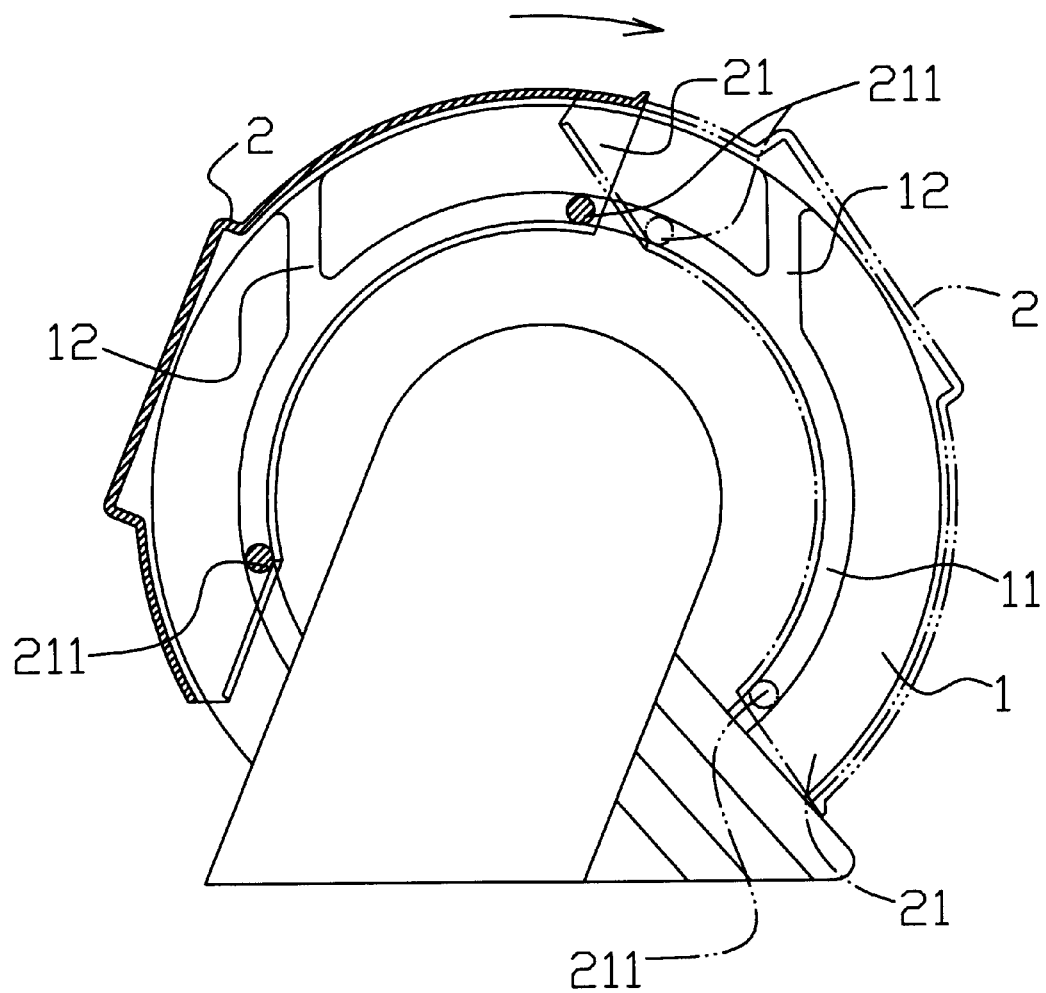
FIG. 3 illustrates how the door is open and closed.

FIG. 3 illustrates how the door 2 is open or closed. As shown, when the door 2 is rotated to the right (with respect to FIG. 3), the protuberances 211 at the inner side of the flange 21 of the door 2 will slide along the circular groove 11 at the lateral end of the body portion to the position as shown in phantom lines. When desired to close the door 2, it is only necessary to rotate the door 2 in a reverse direction.

Figure 4:
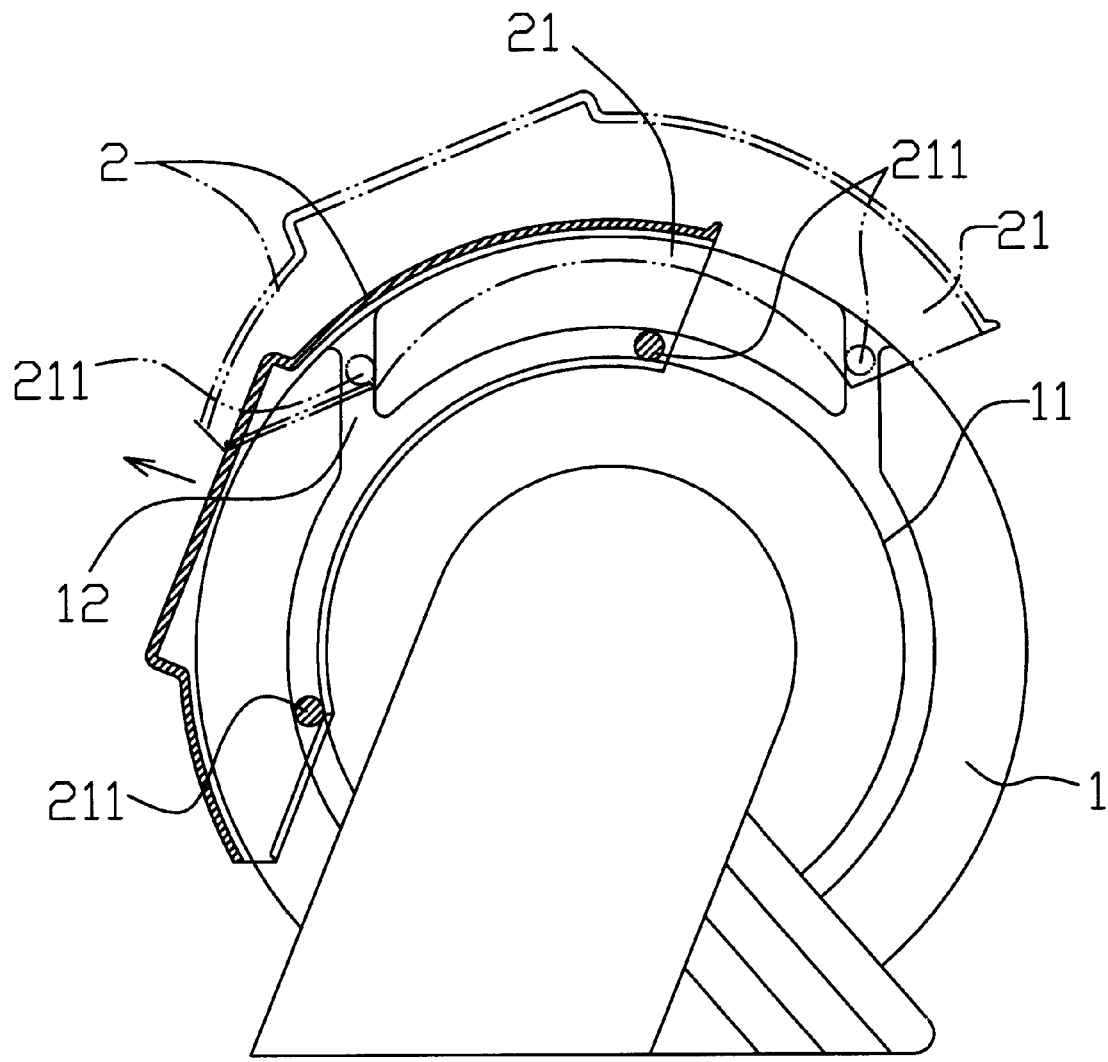
FIG. 4 illustrates how the door is removed from the body portion.
Figure 5:
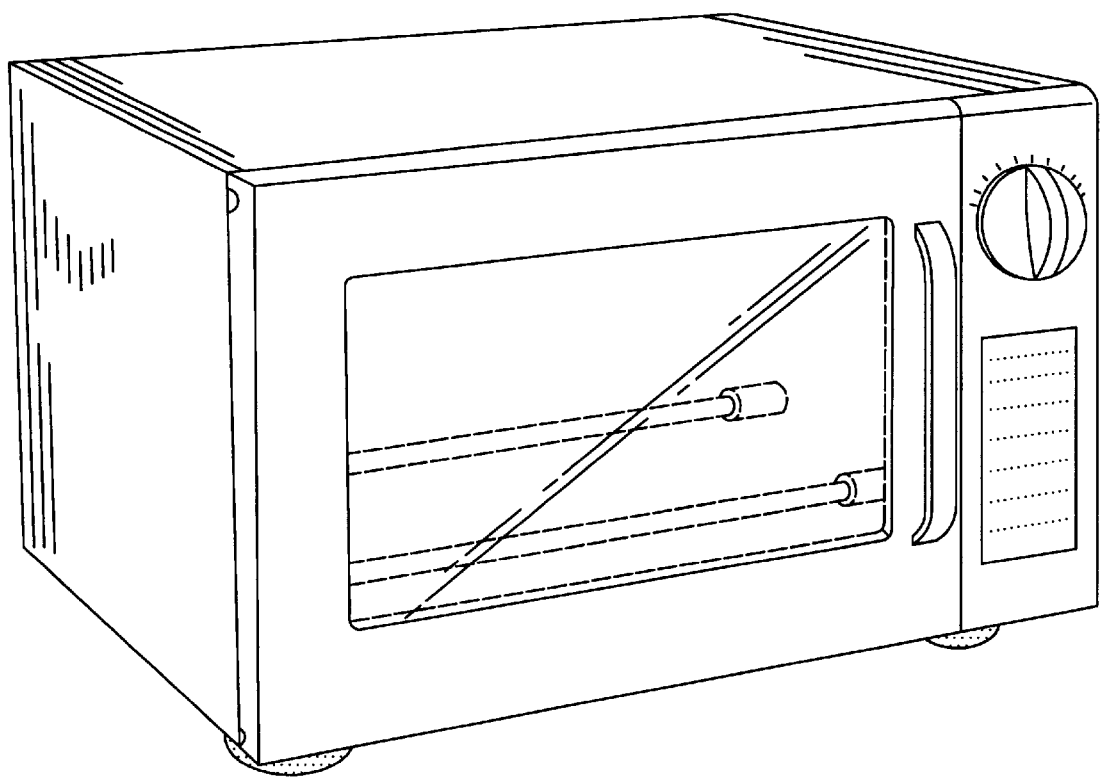
FIG. 5 is a perspective view of a prior art oven.

FIG. 4 illustrates how the door 2 is dismantled from the oven for removing the grease and other drippings extracted from food during the roasting process. When desired to disengage the door 2 from the oven for cleaning, it is only necessary to rotate the door 2 to the top of the body portion 1 so that the protuberances 211 of the door 2 are aligned with the vertical slots 12 of the body portion 1. Then, the door 2 can be lifted to disengage from the body portion 1 thereby enabling it to be cleaned. When desired to engage the door 2 with the body portion 1, it is only necessary to arrange the door 2 on the top of the body portion 1 with the protuberances 211 aligned with the vertical slots 12 and then lower down the cover 2 on the body portion 1 so that the cover 2 can be turned open or closed as desired.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. In an oven having a body portion and a door engageable with said body portion, said body portion being generally cylindrical in shape having two lateral sides each formed with a circular groove, each of said lateral sides having two vertical slots extending upwardly from said circular groove, said door having two flanges at two ends thereof each provided with two protuberances at an inner side thereof, said protuberances being configured to be slidable within said circular groove and said vertical slots.

* * * * *